United States Patent [19]

McGeary et al.

[11] Patent Number: 4,865,804

[45] Date of Patent: Sep. 12, 1989

[54] FUEL ROD END PLUG

[75] Inventors: Robert K. McGeary, W. Homestead; George D. Bucher, McCandless Twp., Allegheny County, both of Pa.

[73] Assignee: Westinghouse Electric Corp., Pittsburgh, Pa.

[21] Appl. No.: 606,424

[22] Filed: May 2, 1984

[51] Int. Cl.⁴ .................................................. G21C 3/10
[52] U.S. Cl. .................................. 376/451; 219/121.63; 219/121.64
[58] Field of Search ............. 376/451; 219/121 L, 219/121 LC, 121 LD, 124.4

[56] References Cited

U.S. PATENT DOCUMENTS

| | | | |
|---|---|---|---|
| 3,607,638 | 9/1971 | Seim | 376/451 |
| 3,836,431 | 9/1974 | Flipot | 376/451 |
| 4,003,788 | 1/1977 | Boyko | 376/451 |
| 4,188,521 | 2/1980 | Yeo | 219/124.4 |

FOREIGN PATENT DOCUMENTS

54-141990  5/1979  Japan ......................... 376/451

*Primary Examiner*—Donald P. Walsh

[57] ABSTRACT

A nuclear reactor fuel rod end plug (100) is adapted to be welded within each end of a nuclear reactor fuel rod cladding tube, especially by means of laser beam welding techniques, although TIG welding techniques may also be employed, wherein an annular groove (126) is defined about the external periphery of the end plug (100) so as to extend radially inwardly of the long land region (118) of the plug (100) within the vicinity of the juncture of the land surface (118) and the shoulder portion (120) at which location the girth weld between the end plug (100) and the cladding tubing will be defined. When employing laser beam welding techniques to accomplish the butt-type girth weld between the plug (100) and the cladding tube, the groove (126) serves to eliminate porosity defects within the weldment, and when employing TIG welding techniques to accomplish the butt-type girth weld between the plug (100) and the cladding tube, the groove (126) serves to eliminate porosity defects within the weldment without requiring the plug land (118) and shoulder (120) surfaces to be accurately machined in accordance with precisely critical dimensional tolerances, and similarly for the mating surfaces of the cladding tube, as had previously been mandatory in accordance with prior art TIG welding techniques.

22 Claims, 4 Drawing Sheets

FUEL ROD END PLUG

BACKGROUND OF THE INVENTION

1. Field of the Invention:

The present invention relates generally to nuclear reactor fuel assemblies, and more particularly to a new and improved end plug which is adapted to be welded within the ends of nuclear reactor fuel rods in order to close the same when fabricating the fuel rods for subsequent incorporation within the nuclear reactor core fuel assemblies, wherein the particular end plug of the present invention facilitates the elimination of structural defects and adverse properties conventionally characteristic of the fuel rod-end plug assembly circumferential or girth weld beads, especially when the welding operations are performed in accordance with laser welding techniques, although the teachings of the present invention may also be applicable to those fuel rod-end plug assembly weld beads when the welding operations are performed in accordance with TIG welding techniques.

2. description of the Prior Art:

As is well known in the nuclear power plant art, the nuclear reactor core of a typical nuclear reactor facility or power plant may comprise, for example, at least one hundred or more fuel assemblies, and each fuel assembly, in turn, may comprise, for example, several hundred fuel rods. A conventional fuel assembly may comprise, for example, what is known as a 17×17 array of fuel rods wherein there are seventeen rows of fuel rod locations, and each row contains seventeen fuel rod locations. Consequently, each fuel assembly comprises two-hundred sixty-four fuel rods, with the remaining locations housing control rod thimble tubes and an instrumentation tube. Thus, if the reactor core comprised at least one hundred fuel assemblies, it can readily be seen that the core would comprise more than twenty-five thousand fuel rods.

The nuclear reactor core fuel pins or fuel rods conventionally comprise thin-walled tubing or cladding within which the fissionable material is housed and supported in a totally encased manner during operation of the reactor. The cladding serves to prevent contact and chemical reactions from occurring between the nuclear fuel and the surrounding environment, such as, for example, the coolant water in a pressurized water reactor (PWR), and of course the cladding additionally serves to confine the radioactive fissionable material therewithin. In order to achieve the aforenoted operational objectives, the cladding must therefore be corrosion-resistant, non-reactive, and heat conductive. Conventionally employed materials utilized in the fabrication of the fuel rod cladding include, for example, type 304 stainless steel, or zirconium based alloys, such as, for example, zircaloy-2 or zircaloy-4. The zirconium based alloys are in fact preferable over the stainless steel materials in view of the fact that the zirconium alloys exhibit relatively low capture cross-sections with respect to thermal neutrons.

In accordance with actual conventional fuel pin or fuel rod fabrication techniques, the nuclear fuel, which is usually in the form of cylindrical pellets or uranium dioxide ($UO_2$) enriched with U-235, is hermetically sealed within the fuel rod cladding or tubing by inserting the fuel within the cladding or tubing and subsequently capping both ends of the cladding or tubing with end plugs or closures which are temporarily attached to the tubing or cladding by means of a friction or force fit. The end plugs are then permanently sealed in position within the tubing or cladding by means of welding operations which are performed, for example, by means of automatic welding apparatus which rotates the fuel rod tubing relative to an electrode so as to thereby form a girth weld at the cladding-plug interfaces, the resulting assemblage of the cladding and end plugs thereby defining the completed fuel rods or pins.

To date, and prior to the invention embodied within the present patent application, all of the aforenoted thousands of fuel tubing-end plug girth weld interfaces have in fact been achieved in accordance with conventional tungsten inert gas (TIG) welding techniques. TIG welding techniques have of course been in existence for many years and have been employed in connection with welding operations within many various fields or environments. TIG welding operations are in fact highly reliable and are relatively trouble-free. Production cycle time is relatively fast, however, with the advent of laser welding technology, it has been readily realized that TIG welding operations are not nearly as fast as laser welding operations. Consequently, in order to render welding operations more cost effective and economical, it has been desired to employ laser welding techniques wherever possible in lieu of TIG welding techniques. It can be further appreciated that in connection with the particular fabrication processing of nuclear reactor fuel rods, particularly in view of the number of weld interfaces that are required in connection with the number of fuel rods comprising a single nuclear reactor power plant core, considerable economic advantages are capable of being achieved if in fact laser welding techniques can be employed. Unfortunately, prior to the invention embodied within the present application, the fuel rod-end plug girth welds exhibited serious structural defects or deficiencies when laser welding techniques were in fact employed in lieu of conventionally acceptable TIG welding techniques heretofore employed in achieving such weld interfaces.

Figure 1:
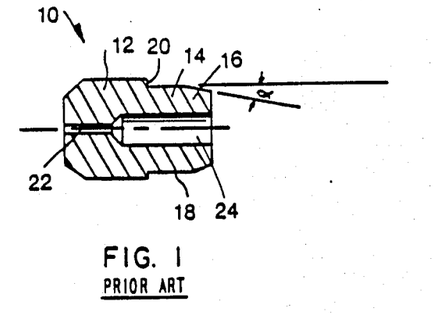
FIG. 1 is a cross-sectional view of a conventional nuclear reactor fuel rod end plug showing the various component parts thereof, particularly the sharply defined internal corner structure defined between the annular radially extending shoulder portion and the circumferentially extending, axially oriented land surface, of the plug.

The foregoing may be better appreciated if reference is made, for example, to FIG. 1 of the drawings which discloses a conventional long-land end plug normally employed for sealing the ends of fuel rod tubes or cladding wherein the assembled fuel rods will be subsequently employed within a 17×17 core fuel assembly. The conventional end plug is generally indicated by the reference character 10 and is seen to be in the form of a substantially right circular cylinder having a larger diameter portion 12 and a small diameter portion 14. Small diameter portion 14 is provided with a tapered forward end 16 wherein the angle of taper α may be, for example, 10°, the tapering of the forward end of the plug 10 serving to facilitate insertion of the plug 10 within the fuel rod cladding or tubing, not shown. The rearwardly extending remainder portion 18 of small diameter portion 14 of the plug 10 forms a circumferential land area which will frictionally engage the interior surface of the cladding or tubing end when the end plug 10 is inserted within the cladding or tubing, not shown. Due to the different diametrical extents of end plug portions 12 and 14, a circumferentially extending flange or shoulder portion 20 is defined therebetween, and the end plug 10 is further provided with a bore 22 which serves to introduce high-pressure inert gas into the fuel rod cladding or tubing for completion of the assembled cladding-end plug fuel rod. An enlarged co-axial bore 24 serves to provide fluidic communication between the gas inlet orifice or bore 22 and the interior of the fuel rod, it of course being understood that subsequent to the charging of the fuel rod interior with the pressurized inert gas, bore or orifice port 22 is sealed by means of a suitable welding operation.

In the fabrication of fuel rod end plugs 10, it has been imperative that quality control be high, particularly in connection with the tolerances for the production of the flanged or shoulder portion 20 as well as the land area 18 so that, in turn, the corner defined between such relatively perpendicularly oriented surfaces is square and sharp. Similarly, the edge surfaces of the cladding or tubing which are to mate with the corresponding surfaces and corner structure of the end plugs should likewise be accurately defined so as to eliminate unacceptable tolerance gaps defined between such mating surfaces. These manufacturing tolerances have in fact proven to be critical in view of the fact that should such tolerances not be achieved or adhered to, various internal structural defects will result in light of the TIG welding operations being performed. For example, porosity conditions will be observed within the weld bead, which can lead to structural integrity and strength problems, and similarly, a condition known as ID undercut, wherein there is exhibited a reduction in the thickness of the cladding or tubing portion adjacent the weld area, can likewise manifest itself so as to also lead to structural integrity and strength problems, it being particularly remembered that the enclosed fuel rods are internally pressurized wherein structural weaknesses within the fuel rod casings and welds would be especially undesirable. As a result of such adherence to high quality control standards, such structural defects have in fact been minimized in connection with the fabrication of conventional fuel rods utilizing TIG welding techniques.

In seeking to employ laser beam welding technology and techniques to the aforenoted type of fuel rod cladding-end plug assemblies, it has been observed that while ID undercut defects or deficiencies have not manifested themselves within the weld metal, porosity defects or deficiencies have in fact been enhanced relative to similar welding techniques employing TIG welding. Such porosity defects can be seen with reference being made to FIGS. 2 and 3 which disclose spheroidized gas pores or, in other words, a string of porosity defects, the photographs disclosing a midplane surface of the laser weld under 10x 50x magnification conditions, respectively, appearing in the weld bead when laser beam welding techniques were employed in connection with conventional fuel rod end plugs as disclosed in FIG. 1 being mated with conventional fuel rod cladding or tubing. While no explicitly definite reasons have been tendered in connection with the occurrence of such phenomena adversely affecting the structural properties of the weld beads, gas present within the vicinity or region of the inner corner of the end plug as defined by the shoulder portion 20 and the land portion 18 thereof apparently becomes trapped within the molten metal pool due to, for example, the various vaporization, solidification, and shrinkage properties characteristic of the fuel rod end plug and cladding tubing components, as well as the weldment defined there-between, when subjected to laser beam welding operations. Consequently, if in fact laser beam welding techniques are to be employed in connection with the fabrication of nuclear reactor fuel rod-end plug assemblies, the occurrence of such aforenoted porosity defects within the weld bead must be prevented.

Accordingly, it is an object of the present invention to provide a new and improved nuclear reactor fuel rod end plug.

Another object of the present invention is to provide a new and improved nuclear reactor fuel rod end plug which will eliminate the various structural deficiencies of conventional fuel rod-end plug assemblies when the assemblies are welded together by means of laser beam welding techniques.

Yet another object of the present invention is to provide a new and improved nuclear reactor fuel rod end plug which will in fact facilitate the employment of laser beam welding techniques in connection with the fabrication of nuclear reactor fuel rod-end plug assemblies without developing any substantial adverse or deleterious structural deficiencies within the assemblies.

Still another object of the present invention is to provide a new and improved nuclear reactor fuel rod end plug which will enable laser beam welding techniques to be employed in connection with the fabrication of nuclear reactor fuel rod-end plug assemblies so that such assemblies may in fact be fabricated in a substantially cost-effective manner.

Yet still another object of the present invention is to provide a new and improved nuclear reactor fuel rod end plug which will enable laser beam welding techniques to be employed in connnection with the fabrication of nuclear reactor fuel rod-end plug assemblies regardless of whether or not the nuclear reactor fuel rod cladding or tubing, as well as the end plugs, are fabricated from stainless steel or zirconium alloys.

Still yet another of the present invention is to provide a new and improved nuclear reactor fuel rod end plug which will enable TIG welding techniques to be employed in connection with the fabrication of nuclear reactor fuel rod-end plug assemblies in a substantially improved cost-effective manner as compared to conventional fabrication processing of nuclear reactor fuel rod-end plug assemblies by TIG welding in view of the fact that the machining costs are able to be substantially reduced because the end plug corners and surfaces, as well as the surfaces and edges of the fuel rod cladding or tubing, are no longer required to have the requisite critical dimensions, within predetermined critical tolerances, as was characteristic of conventional nuclear reactor fuel rod cladding or tubing and end plugs when such fuel rod-end plug assemblies were to be assembled employing TIG welding techniques.

A further object of the present invention is to provide a new and improved nuclear reactor fuel rod end plug which imparts to the nuclear reactor fuel rod-end plug assemblies improved joint characteristics.

A yet further object of the present invention is to provide a new and improved nuclear reactor fuel rod end plug which facilitates the nuclear reactor fuel rod cladding or tubing-end plug assemblies to be welded together by means of laser beam welding apparatus which may operate at considerably reduced power levels.

A still further object of the present invention is to provide a new and improved nuclear reactor fuel rod end plug which will facilitate the achievement of full penetration welds within the nuclear reactor fuel rod cladding or tubing-end plug joint regions at reduced power levels, and which will further facilitate the more precise verification of such full penetration weld

SUMMARY OF THE INVENTION

The foregoing and other objectives are achieved in accordance with the present invention through the provision of a new and improved nuclear reactor fuel rod end plug wherein the conventional circumferentially extending annular flange or shoulder portion, defined between the end plug land surface of the end plug small diameter portion and the end plug large diameter portion, and against which the end of the fuel rod cladding or tubing will be engaged in a butt contact fashion, has been effectively eliminated, or in other words, has had its structural definition drastically altered. As has been noted hereinbefore, the conventional annular shoulder portion was of necessity structurally defined to include an internal corner structure along with the end plug land area which exhibited sharply defined surface areas within critical tolerance parameters in order to combat the conventional generation or development of internal structural deficiencies which had manifested themselves in connection with conventional TIG welding techniques employed to achieve the girth weld defined between the nuclear reactor fuel rod end plugs and the cladding or tubing.

In accordance with the particular structure of the new and improved nuclear reactor fuel rod end plug of the present invention, a groove or notch is formed within the vicinity of the aforenoted conventional internal corner structure so as to effectively replace the same. The groove or notch extends around the entire periphery of the plug and is defined between the large and small diameter portions of the end plug. More particularly, the peripheral groove or notch is partially defined by means of an annularly extending shoulder or flanged portion or wall similar to the conventional end plug annular shoulder or flanged portion, however, the radially inwardly extending depth or extent of the annular shoulder portion of the end plug of the present invention is substantially greater than that of the conventional fuel rod end plug. In addition, in lieu of the land area of the end plug meeting or engaging the annular shoulder portion in a perpendicular manner so as to define the conventional internal corner structure with an included angle of 90°, an annularly extending, radially outward conical surface extends from the annular shoulder wall portion to the end plug land surface, the included angle β being on the order of, for example, 45°. The provision of such a radially inwardly disposed annular groove or notch defined within the sidewall of the fuel rod end plug at the axial boundary of the end plug small and large diameter portions has served to eliminate structural defects or deficiencies within the interior portions of the girth weld defined between the end plugs and the fuel rod cladding or tubing, such as, for example, porosity or spheroidized gas pores, under laser beam welding conditions.

Apparently, in accordance with the present invention, the provision of the annularly extending open notch within the weld zone, in lieu of the conventional sharply defined, critically toleranced, fitted corner structure, facilitates the escape of any entrapped gas or bubbles. It is to be noted that such an improvement as is herein disclosed is considered to be especially unobvious and novel in view of the fact that such a structural modification of conventional fuel rod end plugs would constitute, or mandate a conclusion that the improvement of the present invention was, a teaching away from the prior art as attested to by the previous results achieved in connection with conventional TIG welding techniques wherein similar problems were resolved by achieving increasingly accurate fitting or mating of the fuel rod end plugs and the fuel rod cladding or tubing through means of higher quality control monitoring of the structural component tolerance parameters. To the contrary, of course, such critical machining tolerances have, in effect, been substantially relaxed, whereby the remarkable results of the present invention welding processing have been able to be achieved, particularly in connection with the employment of laser beam welding techniques in the fabrication of nuclear reactor fuel rods, although, as will become apparent, the teachings of the present invention could likewise be applied to TIG welding operations.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DESCRIPTION OF THE PREFERRED EMBODIMENT

Figure 4:
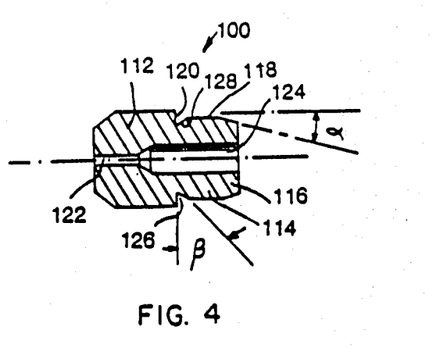
FIG. 4 is a cross-sectional view, similar to that of FIG. 1, showing, however, the new and improved nuclear reactor fuel rod end plug constructed in accordance with the present invention and showing the corresponding parts thereof, particularly the open notch or groove annularly defined within the region of the butt-type girth weld defined between the end plug and the cladding tubing.

Referring now to the drawings, and more particularly to FIG. 4 thereof, there is shown the new and improved nuclear reactor fuel rod end plug constructed in accordance with the present invention and generally designated by the reference character 100. It is to be initially noted at this juncture that the new and improved end plug 100 of the present invention is similar to the conventional prior art end plug 10 shown in FIG. 1, except of course for the particularly new improvements thereof which in fact constitute the present invention, and consequently, all component parts or structural features which are similar or common to both the conventional end plug 10 and the new and improved end plug 100 of the present invention have been designated with corresponding reference characters except that all structural components of the new and improved end plug 100 of the present invention have been designated with reference characters within a 100 series.

In particular, then, in accordance with the teachings of the present invention, it is seen that in lieu of the sharply defined interior corner characteristic of the conventional nuclear reactor fuel rod end plug 10 as formed by the circumferentially extending, axially oriented, land surface 18 and the annularly extending, radially oriented shoulder portion 20, which surfaces are fabricated in accordance with critically toleranced dimensional values, as are the corresponding mating surfaces of the fuel rod cladding tubing, not shown, in order to eliminate the conventional internal structural defects or deficiencies which had previously manifested themselves in connection with the employment of TIG welding techniques for performance of the end plug-fuel rod cladding tubing girth welds, the new and improved nuclear reactor fuel rod end plug 100 of the present has eliminated such precisely fabricated corner structure and has replaced the same with a machined notch or groove 126 which extends annularly about the end plug 100. It is seen that the notch or groove 126 is formed in part by means of the radially oriented, annularly extending shoulder portion 120 as well as by means of a conical surface 128 which extends radially outwardly from the radially innermost portion of shoulder 120 to circumferentially extending, axially oriented land surface 118, surface 128 being disposed at an angle β of 45° with respect to shoulder portion or surface 120 and extending toward the tapered forward end 116 of the plug 100.

Figure 2:
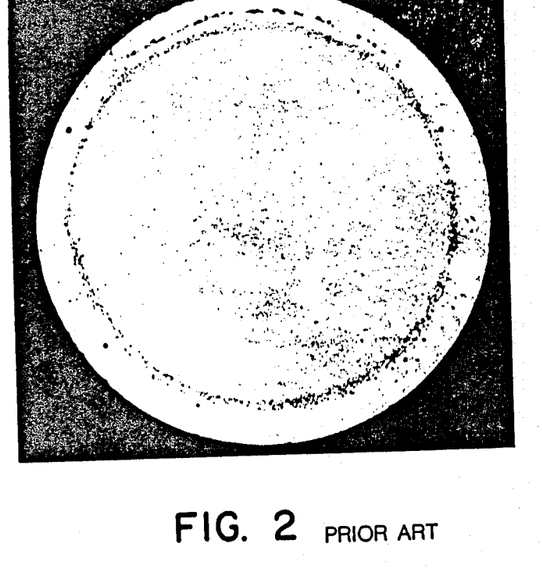
FIG. 2 is a photograph, taken at 10x magnification power, of a transverse section through the girth weldment of a nuclear reactor fuel rod end plug-cladding tube assembly employing a conventional end plug as shown in FIG. 1, and wherein the welding operations were performed employing laser beam welding techniques, the photograph quite clearly revealing the porosity defects or deficiencies.
Figure 3:
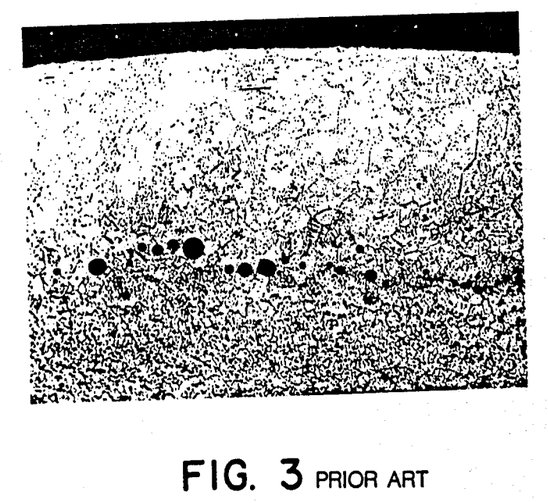
FIG. 3 is a photograph, taken at 50x magnification power, of a section of the weldment shown in FIG. 2 wherein the porosity defects or deficiencies are even more clearly apparent than may be seen from FIG. 2.
Figure 5:
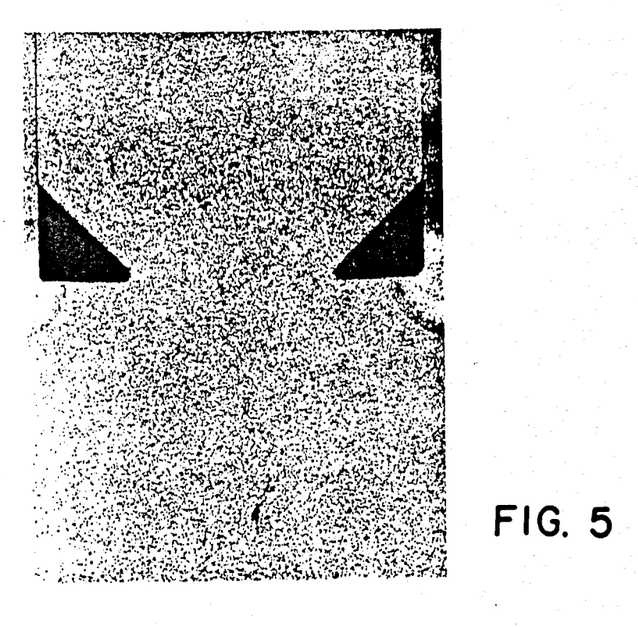
FIG. 5 is a photograph, taken at 3x magnification power, of a vertical section of a nuclear reactor fuel rod end plug-cladding tubing weld assembly employing the new and improved nuclear reactor fuel rod end plug of the present invention as shown in FIG. 4, and wherein the weldment was achieved utilizing laser beam welding techniques.
Figure 6A:
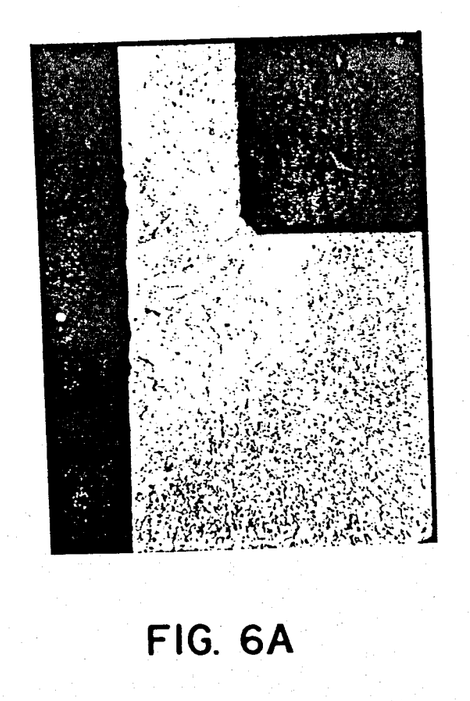
FIGS. 6A and 6B are photographs, taken at 50x magnification power, of the left and right girth weld areas defined between the fuel rod end plug and the cladding tubing as shown in FIG. 5, respectively.
Figure 6B:
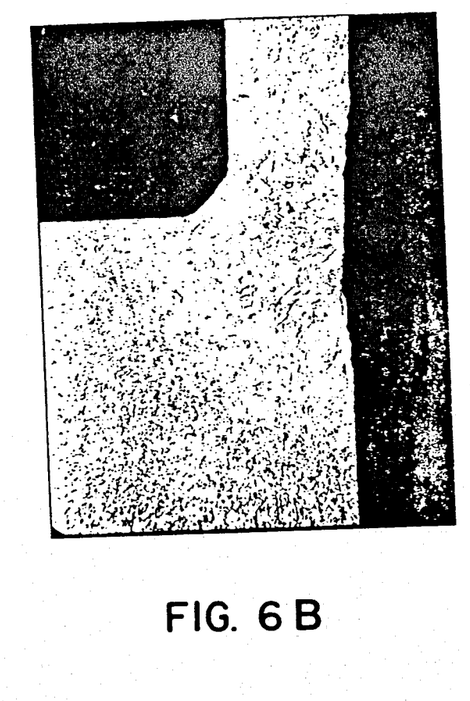
Figure 7:
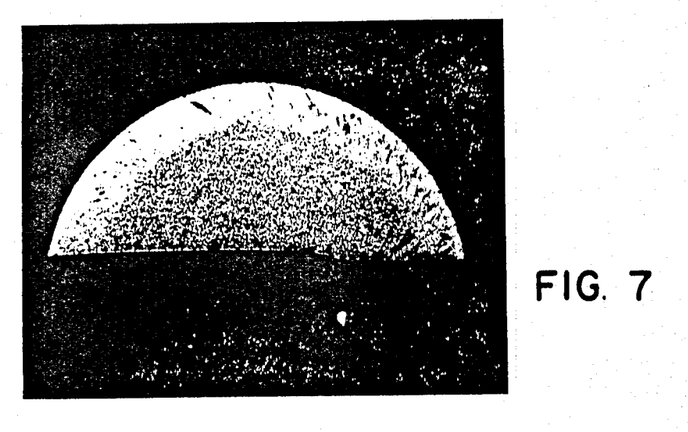
FIG. 7 is a photograph, taken at 10x magnification power, of a one-half transverse section similar to that of FIG. 2, showing, however, a girth weld section of the nuclear reactor fuel rod end plug-cladding tubing assembly of FIG. 5 wherein it is clearly apparent that the weldment is free of porosity defects.

As has been noted hereinabove, while the conventional nuclear reactor fuel rod end plug 10, with its particular, critically toleranced interior corner structure as defined by annular shoulder surface 20 and land surface 18, has facilitated the production of girth welds defined at the fuel rod end plug-cladding tubing which have been free of internal defects or deficiencies when the girth welds were formed utilizing TIG welding techniques and apparatus, porosity defects in fact manifested themselves within the girth welds at the fuel rod end plug-cladding tubing juncture when the conventional end plugs 10 were employed, and when laser beam welding techniques and apparatus were being utilized, such defects or deficiencies being shown in FIGS. 2 and 3. However, when the new and improved nuclear reactor fuel rod end plug 100 of the present invention was employed within the end plug-cladding tubing assemblies, and the same were welded together by means of laser beam welding techniques and apparatus, the resulting weldments defined between the end plugs and the cladding tubing were free of the aforenoted porosity defects or deficiencies, as best seen with reference being made to FIGS. 5 and 6A-6B. As may be particularly seen from these photographic figures, desirable fillets have formed between the cladding tube walls and the annular shoulder wall 120 of the end plugs, and the entire weldments disclose as absence of porosity defects. A similar appreciation of the defect-free weldment produced as a result of employment of the end plug 100 of the present invention under laser beam welding conditions may also be attained from reference to the photographic figure of FIG. 7.

The aforenoted production of the nuclear reactor fuel rod end plug-cladding tubing assembly was in fact produced, for example, by means of welding operations wherein a RAYTHEON 550 YAG laser was employed. The groove or notch 126 was machined within the sidewall of the end plug 100 to a radially inwardly depth or extent of 0.100 inches as measured from the outer surface of the land area 118, however, it later became apparent after production review of, for example, FIG. 5, that a full penetration weld had in fact been adequately achieved, and that a similarly adequate heat affected zone could have been achieved with an annular groove 126 machined to a depth of, for example, only 0.05–0.07 inches. It is also to be noted at this juncture in connection with the actual production of the satisfactory weldment between the fuel rod end plug of the present invention and the fuel rod cladding tubing, that an additional benefit derived from the usage of the end plug 100 of the present invention resides in the fact that as a result of the provision of the groove or notch 126 within the end plug 100, approximately one-half of the end plug's effective heat sink has been removed. Consequently, it was also observed during production of the end plug-cladding tubing weldment utilizing laser beam technology, that in lieu of normally being required to operate the laser equipment at a power rating of, for example, 400 watts with the attendant standardized parameters in order to achieve a satisfactory weld of this type, in accordance with the welding process employing the end plug 100 of the present invention, the aforenoted satisfactory full penetration weld was in fact able to be accomplished utilizing the laser equipment at a power rating of only 340 watts. This is a significantly positive result achieved in connection with the fabrication of the end plug-cladding tubing assemblies in view of the fact that if the laser equipment need not necessarily be operated at its maximum power rating, extending service life will be able to be achieved.

It is lastly to be noted that while the present invention has in fact been developed in order to overcome the various drawbacks of accomplishing nuclear reactor fuel rod end plug-cladding tubing welded assemblies utilizing laser beam welding technology, whereby production defects or structural deficiencies have been able to be eliminated, the particular end plug structure of the present invention is likewise applicable to TIG welding technology. It is to be remembered that TIG welding techniques have been heretofore successfully employed in connection with the weld production of nuclear reactor fuel rod end plug-cladding tubing assemblies only because high quality-control criticalities were enforced in connection with the production of the end plugs and their mating cladding tubes. However, as a result of the present invention, such criticalities or production tolerances are no longer mandatory. Consequently, the machining costs involved in connection with the production of end plugs and cladding tubing for the end plug-cladding tubing assemblies may be significantly reduced. It is to be noted that in view of the higher energy input requirements characteristic of TIG welding operations as compared to those of laser beam welding operations, the groove or notch 126 of the end plug 100 of the present invention may have to be larger both in radial depth and axial extent, and in fact may have to be altered so as to comprise a different geometrical configuration, such as, for example, that of a square viewed in cross-section, as opposed to the triangularly configured groove or notch 126 which has effectively been employed in connection with laser beam welding techniques as illustrated in FIG. 4.

Thus, it may be seen that the present invention has significant advantages over known prior art nuclear reactor fuel rod end plugs in that by means of the provision of the notch or groove 126 within the end plugs 100 of the present invention, porosity defects or structural deficiencies within the weldment may in fact be eliminated regardless of whether TIG or laser beam welding technology is being employed. It is to be emphasized that while the present invention was initially developed to especially overcome defects or deficiencies manifesting themselves in connection with laser beam welding operations in connection with the fabrication of nuclear fuel rod end plug-cladding tubing assemblies, it is in fact equally applicable to TIG welding operations as noted hereinabove and for the reasons set forth hereinbefore. It is to be especially emphasized at this point, however, and in light of the development of TIG welding operations in connection with the fabrication of nuclear reactor fuel rod end plug-cladding tubing assemblies, that the present invention must be considered to be, in effect, a dramatic teaching away from the prior art. In particular, porosity defects or deficiencies had in fact manifested themselves in connection with the fabrication of nuclear reactor fuel rod end plug-cladding tubing assemblies employing TIG welding technology, however, such defects or deficiencies were able to be subsequently controlled and effectively eliminated by the adherence to strict quality control manufacturing tolerances. Consequently, when such similar defects or structural deficiencies manifested themselves within the end plug-cladding tubing assemblies fabricated in accordance with laser beam welding technology, it would have followed that continued adherence to such manufacturing tolerances, or adherence to increasingly critical manufacturing tolerances would have rectified the problem of the occurrence of the porosity defects within the laser beam welded regions. However, this proved not to be the case. Subsequently, the present invention was developed wherein it is appreciated that the present invention has developed the technology in an effectively diametrically opposite mode or teaching away from such prior art or known processes. In lieu of increasing manufacturing tolerance criticalities, and the requirement of strictly adhering thereto, the present invention has in fact effectively relaxed such requirements.

Figure 8:
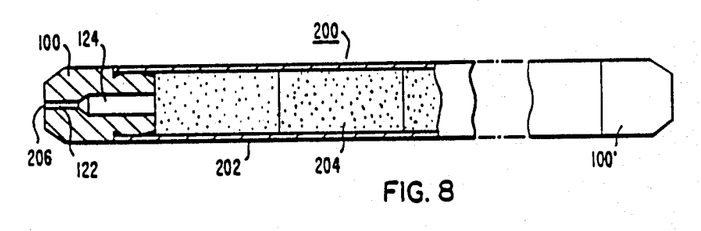
FIG. 8 is an elevational view of a fuel rod, partly in section, showing nuclear fuel pellets therein.

As can be appreciated by those skilled in the art, references in the specification and claims to particular angles and dimensions in describing the end plug of the present invention are to be construed as indicating preferable and general such angles and dimensions. Also, as is known to those skilled in the art and shown in FIG. 8, a typical nuclear reactor fuel rod 200 (which contains fuel pellets 204) employing the present invention would include one end plug 100 as shown in FIG. 4 welded to one end of the cladding tube 202 and a second end plug 100' as shown in FIG. 4 but without the bore 122 and without the bore 124 (i.e. a solid such end plug) welded to the other end of the cladding tube 202. Additionally, the bore 122 is closed by a seal weld at its outside opening 206.

Obviously, many modifications and variations of the present invention are possible in light of the above teachings. It is therefore to be understood that within the scope of the appended claims, the present invention may be practiced otherwise than as specifically described herein.

We claim:

1. An end plug for welded disposition within the end of a tube, comprising:
   a circumferentially extending, axially oriented land surface, having a radial extent defined by means of a first predetermined dimension, for disposition within said end of said tube;
   a circumferentially extending, axially oriented land surface, having a radial extent defined by means of a second predetermined dimension which is greater than said first predetermined dimension, for disposition outside of said end of said tube, said second land surface being disposed upstream of said first land surface;
   an annularly extending, radially oriented shoulder portion, defined at the downstream end of said second land surface and having a radially inward depth which is greater than the difference defined between said first and second radial dimensions of said first and second land surfaces, for engaging said end of said tube in a butt contact fashion; and
   annular groove means defined between the upstream end of said first land surface and said shoulder portion of said end plug, for eliminating porosity defects normally developed within a weldment defined between said tube end and said end plug when said end plug is welded within said tube end, and including a conical surface which extends radially outwardly from the innermost radial depth extent of said shoulder portion to said upstream end of said first land surface.

2. An end plug as set forth in claim 1, wherein:
   said conical surface is disposed at an angle of 45° with respect to said shoulder portion of said end plug.

3. An end plug as set forth in claim 1, wherein:
   said end plug is a nuclear reactor fuel rod end plug for disposition within the end of a nuclear reactor fuel rod cladding tube.

4. An end plug as set forth in claim 1, wherein:
   said groove is defined to a radially inwardly extending depth of 0.100 inches.

5. An end plug as set forth in claim 1, further comprising:
   means for forming said weldment defined between said tube and said end plug by laser beam welding.

6. An end plug as set forth in claim 1, further comprising:
   TIG welding means for forming said weldment defined between said tube and said end plug.

7. An end plug as set forth in claim 1, wherein: said end plug is fabricated from stainless steel.

8. An end plug as set forth in claim 1, wherein: said end plug is fabricated from a zirconium alloy.

9. An end plug as set forth in claim 1, wherein: said weldment is an annular girth weld defined about the outer periphery of said juncture defined between said end plug and said tube.

10. An end plug for welded disposition within the end of a tube by means of laser beam welding techniques, comprising:
a first circumferentially extending, axially oriented land surface, having a radial extend defined by means of a first predetermined dimension, for disposition within said end of said tube;
a second circumferentially extending, axially oriented land surface, having a radial extent defined by means of a second predetermined dimension which is greater than said first predetermined dimension, for disposition outside of said end of said tube, said second land surface being disposed upstream of said first land surface;
an annularly extending, radially oriented shoulder portion, defined at the downstream end of said second land surface and having a radially inward depth which is greater than the difference defined between said first and second radial dimensions of said first and second land surfaces, for engaging said end of said tube in a butt contact fashion; and
annular groove means defined between the upstream end of said first land surface and said shoulder portion of said end plug, for eliminating porosity defects normally developed within a weldment defined between said tube end and said end plug when said end plug is welded within said tube end under said laser beam welding conditions, and including a conical surface which extends radially outwardly from the innermost radial depth extent of said shoulder portion to said upstream end of said first land surface.

11. An end plug as set forth in claim 10, wherein: said end plug is a nuclear reactor fuel rod end plug for disposition within the end of a nuclear reactor fuel rod cladding tube.

12. A nuclear reactor fuel rod end plug for fixation within the end of a nuclear reactor fuel rod cladding tube by means of a welding process, comprising:
a first circumferentially extending, axially oriented land surface, having a radial extent defined by means of a first predetermined dimension, for disposition within said end of said tube;
a second circumferentially extending, axially oriented land surface, disposed upstream of said first land surface and having a radial extent defined by means of a second predetermined dimension which is greater than said first predetermined dimension, for disposition outside of said end of said tube;
an annularly extending, radially oriented shoulder portion, defined at the downstream end of said second land surface and having a radially inward depth which is greater than the difference defined between said first and second radial dimensions of said first and second land surfaces, for engaging said end of said tube in a butt contact fashion; and
annular groove means defined between the upstream end of said first land surface and said shoulder portion of said end plug, for eliminating porosity defects normally developed within a weldment defined between said end plug and said tube end when said end plug is welded within said tube end by means of said welding process, and including a conical surface which extends radially outwardly from the innermost radial depth extent of said shoulder portion to said upstream end of said first land surface.

13. A nuclear reactor fuel rod end plug as set forth in claim 12, wherein:
means for forming said weldment defined between said tube and said end plug by laser beam welding.

14. An end plug for welding to each end of a nuclear reactor fuel rod cladding tube, said end plug comprising:
a generally right circular cylindrical smaller diameter portion and a coaxially joined generally right circular cylindrical larger diameter portion, the juncture of said smaller and larger diameter portions having a generally radially inwardly extending circumferential groove as defined by means of a radially oriented shoulder surface for engaging said each end of said cladding tube and a conical surface extending radially outwardly from the radially innermost portion of said shoulder surface, with said smaller diameter portion frictionally longitudinally engageable with the interior surface of said tube and with said larger diameter portion having a chamfered free end and having a generally constant diameter from said juncture to said chamfered free end.

15. A nuclear reactor fuel rod, comprising:
(a) a cladding tube;
(b) a plurality of nuclear fuel pellets disposed in said tube; and
(c) an end plug welded to each end of said tube, said end plug including a generally right circular cylindrical smaller diameter portion and a coaxially joined generally right circular cylindrical larger diameter portion, the juncture of said smaller and larger diameter portions having a generally radially inwardly extending circumferential groove as defined by means of a radially oriented shoulder surface for engaging said each end of said cladding tube and a conical surface extending radially outwardly from the radially innermost portion of said shoulder surface, with said smaller diameter portion frictionally longitudinally engaged with the interior surface of said tube and with said larger diameter portion having a chamfered free end and having a generally constant diameter from said juncture to said chamfered free end.

16. An end plug as set forth in claim 10, wherein: said conical surface is disposed at an angle of 45° with respect to said shoulder portion of said end plug.

17. An end plug as set forth in claim 10, wherein: said radially inward depth of said shoulder portion is 0.100 inches.

18. An end plug as set forth in claim 10, wherein: said end plug is fabricated from a zirconium alloy.

19. An end plug as set forth in claim 12, wherein: said conical surface is disposed at an angle of 45° with respect to said shoulder portion of said end plug.

20. An end plug as set forth in claim 12, wherein: said radially inward depth of said shoulder portion is 0.100 inches.

21. An end plug as set forth in claim 12, wherein: said welding process comprises laser beam welding techniques.

22. An end plug as set forth in claim 12, wherein: said end plug is fabricated from a zirconium alloy.

* * * * *